US008122361B2

(12) United States Patent
Avraham et al.

(10) Patent No.: US 8,122,361 B2
(45) Date of Patent: Feb. 21, 2012

(54) PROVIDING A GRAPHICAL USER INTERFACE IN A SYSTEM WITH A HIGH-ASSURANCE EXECUTION ENVIRONMENT

(75) Inventors: Idan Avraham, Seattle, WA (US); Christine M. Chew, Redmond, WA (US); Paul C. Roberts, Kirkland, WA (US); Bryan Willman, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 960 days.

(21) Appl. No.: 10/691,759

(22) Filed: Oct. 23, 2003

(65) Prior Publication Data

US 2005/0091486 A1 Apr. 28, 2005

(51) Int. Cl.
*G06F 3/00* (2006.01)
*H04L 29/06* (2006.01)
(52) U.S. Cl. ......... 715/741; 715/742; 713/164; 713/166
(58) Field of Classification Search .................. 713/168, 713/150, 164, 166; 345/592; 715/803, 767, 715/802, 791, 742, 741, 204, 205, 209, 230, 715/232, 234, 240, 241, 243, 266, 711–713, 715/760, 764, 779, 780, 808–810, 835, 837, 715/841; 711/147, 148, 153
See application file for complete search history.

(56) References Cited

U.S. PATENT DOCUMENTS

| 5,590,266 | A | | 12/1996 | Carson et al. ............... 395/340 |
| 5,822,435 | A | * | 10/1998 | Boebert et al. ............... 713/192 |
| 6,031,530 | A | * | 2/2000 | Trueblood ................... 715/791 |
| 6,121,962 | A | | 9/2000 | Hwang |
| 6,314,501 | B1 | * | 11/2001 | Gulick et al. ................ 711/153 |
| 6,512,529 | B1 | * | 1/2003 | Janssen et al. ............... 715/790 |
| 7,023,459 | B2 | * | 4/2006 | Arndt et al. .................. 715/764 |
| 7,114,177 | B2 | * | 9/2006 | Rosenberg et al. ............. 726/4 |
| 7,127,683 | B2 | * | 10/2006 | Royalty ....................... 715/781 |
| 2002/0173863 | A1 | * | 11/2002 | Imada et al. .................. 700/83 |
| 2005/0044505 | A1 | * | 2/2005 | Laney et al. .................. 715/781 |
| 2006/0259873 | A1 | * | 11/2006 | Mister ......................... 715/781 |

FOREIGN PATENT DOCUMENTS

EP 1526424 B1 12/2008

(Continued)

OTHER PUBLICATIONS

Eileen Zishuang Ye et al. "Web spoofing revisited: SSL and beyond", Feb. 1, 2002.*

(Continued)

*Primary Examiner* — Tadeese Hailu
*Assistant Examiner* — Haoshian Shih
(74) *Attorney, Agent, or Firm* — Woodcock Washburn LLP

(57) ABSTRACT

Techniques are disclosed to provide security for graphical user interface elements being displayed in a system having a host operating system and a high assurance operating system. Graphical user interface elements associated with the high-assurance operating system may be prevented from being obscured and from any partial transparency. Additionally, a piece of secret information may be stored and displayed by graphical user interface elements associated with the high-assurance operating system. Coordinating certain elements of the graphical user interface elements associated with the high assurance operating system also helps to identify legitimate elements associated with the high assurance operating system. Public title information may be furnished to a host operating system windowing system to identify a window owned by a process running on a high-assurance operating system. Private title information associated with the same window may be used in the high assurance operating system.

30 Claims, 8 Drawing Sheets

FOREIGN PATENT DOCUMENTS

| | | |
|---|---|---|
| JP | 06-138969 | 5/1994 |
| JP | 08-234953 | 9/1996 |
| JP | 09-146751 | 6/1997 |
| JP | 11-272382 | 10/1999 |

OTHER PUBLICATIONS

Eileen Zishuang Ye et al. "Trusted paths for browser: An open-source solution to web spoofing", Feb. 4, 2002.*

Rachna Dhamija "Hash visualization in user authentication", Apr. 2000.*

Garfinkel, T . et al., "Terra: A Virtue Machine-Based Platform for Trusted Computing", *ACm Symposium on Operating Systems Principles, Proceedings of the nineteenth (19th) ACm Symposium on Operating Systems Principles*, 2003, 193-206.

Josang, A. et al., "User Interface Requirements for Authentication of Communication", *ACM International Conference Proceeding Series, Proceedings of the Fourth Australian User Interface Conference on User Interfaces 2003*, 2003, 18, 75-80.

Kent, S.T., "Encryption-Based Protection for Interactive User/Computer Communication", *Proceedings of the Fifth Symposium on Data Communications*, 1977, 5.7-5.13.

Landwehr, C.E. et al., "A Taxonomy of Computer Program Security Flaws", *ACM Computing Surveys (CSUR)*, 1994, 26(3), 211-254.

Salles, E.J. et al., "Security of runtime Extensible Virtual Environments", *Collaborative Virtual Environments, Proceedings of the 4th International Conference on Collaborative Virtual Environments*, 2002, 97-104.

Spalka, Adrian, Cremers, Armin B., Langweg, Hanno, "Protecting the Creation of Digital Signatures with Trusted Computing Platform Technology Against Attacks by Trojan Horse Programs", *Trusted Information. The New Decade Challenge. Proceedings of IFIP/SEC'01*, 2001, 403-419.

Epstein, J. et al., "User Interface for a High Assurance Windowing System", *Computer Security Applications Conference, IEEE Computer Soc.*, 1993, 256-264, XP010096756.

Zishuang (Eileen) Ye, et al. "Trusted Paths for Browsers: An Open-Source Soultion to Web Spoofing", *Technical Report TR 2002-418*, Department of Computer Science Dartmouth College, XP-002329977, Feb. 4, 2002, 1-10.

At WinHEC, Microsoft Discusses Details of Next-Generation Secure Computing Base, http://www.microsoft.com/presspass/features, May 2003, 8 pages.

* cited by examiner

PROVIDING A GRAPHICAL USER INTERFACE IN A SYSTEM WITH A HIGH-ASSURANCE EXECUTION ENVIRONMENT

FIELD OF THE INVENTION

The present invention relates generally to the field of computer security. More particularly, the invention relates to the use of plural execution environments (e.g., operating systems) on a single computing device with a graphical user interface which allows graphical user interface elements to be owned by processes in each of the plural execution environments.

BACKGROUND OF THE INVENTION

In modern computing, many tasks which can be performed on a computer require some level of security. In order to provide a level of security, there are several options. One is to perform all secure applications on a computer which is completely separate from any possibly insecure elements, or to use a virtual machine monitor (VMM) to allow complete separation between two execution environments (e.g. operating systems) running on a single computer system. However, this may be impractical. There may be a need, for cost or convenience reasons, for a secure execution environment to share resources with applications with unassured security, and those applications and those resources may be vulnerable to an attacker. Additionally, where a VMM is used, since a VMM requires full virtualization of the machine and all of its devices (thereby requiring that the VMM provide its own device driver for every possible device), a VMM is not well suited to an open architecture machine in which an almost limitless variety of devices can be added to the machine.

One way to provide the ability to share resources among two execution environments is to provide a computer system in which there is one "main" operating system that controls most processes and devices on a machine, and where a second operating system also exists. This second operating system is a small, limited-purpose operating system alongside the main operating system which performs certain limited tasks. One way to make an operating system "small" or "limited-purpose" is to allow the small operating system to borrow certain infrastructure (e.g., the scheduling facility, the memory manager, the device drivers, etc.) from the "main" operating system. Since a VMM effectively isolates one operating system from another, this sharing of infrastructure is not practical using a VMM.

Certain other techniques allow operating systems to exist side-by-side on the same machine without the use of a VMM. One such technique is to have one operating system act as a "host" for the other operating system. (The operating system that the "host" is hosting is sometimes called a "guest.") In this case, the host operating system provides the guest with resources such as memory and processor time. Another such technique is the use of an "exokernel." An exokernel manages certain devices (e.g., the processor and the memory), and also manages certain types of interaction between the operating systems, although an exokernel—unlike a VMM—does not virtualize the entire machine. Even when an exokernel is used, it may be the case that one operating system (e.g., the "main" operating system) provides much of the infrastructure for the other, in which case the main operating system can still be referred to as the "host," and the smaller operating system as the "guest." Both the hosting model and the exokernel model allow useful types of interaction between operating systems that support sharing of infrastructure.

Thus, these techniques can be used to provide a computer system with at least two execution environments. One of these may be a "high-assurance" operating system, referred to herein as a "nexus." A high-assurance operating system is one that provides a certain level of assurance as to its behavior. For example, a nexus might be employed to work with secret information (e.g., cryptographic keys, etc.) that should not be divulged, by providing a curtained memory that is guaranteed not to leak information to the world outside of the nexus, and by permitting only certain certified applications to execute under the nexus and to access the curtained memory.

In a computer system with two execution environments, one of which is a nexus, it may be desirable for the nexus to be the guest operating system, and a second operating system, not subject to the same level of assurance as to behavior, to be the host operating system. This allows the nexus to be as small as possible. A small nexus allows a higher level of confidence in the assurance provided by the nexus. Therefore operating system functions are run by the host operating system.

One such operating system which may be run by the host operating system is a windowing system. When using a windowing system, a user's display will be populated with windows, areas on the screen which display information from an application. An application may have one or more windows.

When the windowing system is run by the host operating system, rather than by the nexus, it is vulnerable to attack. One such possible attack is known as a spoof. A spoof is an attack in which the user is led to believe that some hardware, system software, application or agent software, or a given window, is a trustworthy entity, even though it is not. The attacker is spoofing a trustworthy entity. This can be used to steal user credentials, or to capture other data of a sensitive nature entered by a user who thinks that the user is using a highly assured entity.

For example, in a system in which the nexus runs a banking program with a log-in screen, an attacker may write a program which runs on the host operating system, and displays a window which looks exactly like the log-in screen of the banking program. When the user is fooled by this spoof window, the user will enter information into the spoof window. This information is captured by the attacker and may then be used by the attacker without the knowledge of the user.

The windowing system is also vulnerable to an attack known as a snooker. In a snooker attack, the attacker changes the user display to make it appear to a user that the system is secure, when it is not. For example, a computer system may include the ability for a user to lock the system, or to allow the computer to sleep or hibernate. A snooker attack, in this case, would simulate the screen displayed when the system is locked, asleep, or hibernating. When the user turns their attention away, thinking that the system is inactive and secure, the attacker makes unauthorized use of the system.

Generally, whatever pattern of pixels a legitimate nexus-side program or functioning system can produce on the monitor, an attacking program on the host-side can imitate. However, in order to maintain the high assurance nature of the nexus, a user must be able to distinguish a legitimate nexus-side user interface graphic element from a fake one.

In view of the foregoing there is a need for a system that overcomes the drawbacks of the prior art.

SUMMARY OF THE INVENTION

In one embodiment, data displayed on a display for a system including a secured execution environment (nexus)

and a second execution environment (host) is secured using a combination of several techniques. Graphical user interface elements, such as windows, which are associated with a process running on the nexus are displayed without overlap from other graphical user interface elements.

Additionally, a nexus-user secret is maintained, which is displayed in the graphical user interface element. This display can occur continuously or, among other alternatives, on request. Additionally, window decorations may be coordinated, in color or in graphics information being displayed, in order to link together in a user's mind the secured windows and thus more clearly highlight impostor windows. These decorations can be changed at certain intervals, upon request, or when a system event triggers the change.

Where a shadow window is maintained for corresponding nexus windows, private title information may be used for the nexus window while a public title is used in the shadow window. This allows the nexus process which sets the titles to choose what information will be given to the possibly insecure shadow window.

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIG. 3(*b*) is a block diagram of a display according to one embodiment of the invention;

DETAILED DESCRIPTION OF THE INVENTION

Overview

When two execution environments, such as operating systems, run side-by-side on a single machine, where one of the environments is a high-assurance execution environment which is held to certain standards of security, it may be important for a user to discern which graphical user interface elements being displayed are associated with processes running on the high-assurance operating system. As discussed above, an attacker displaying a graphical UI element via the host side (non high-assurance) execution environment may attempt to convince a user that a graphical user interface element that is a UI element arising from a high assurance process. In order to prevent such attacks, the present invention provides techniques that allow a user to discern which graphical user interface elements originate in the high-assurance execution environment.

Exemplary Computing Arrangement

Figure 1:
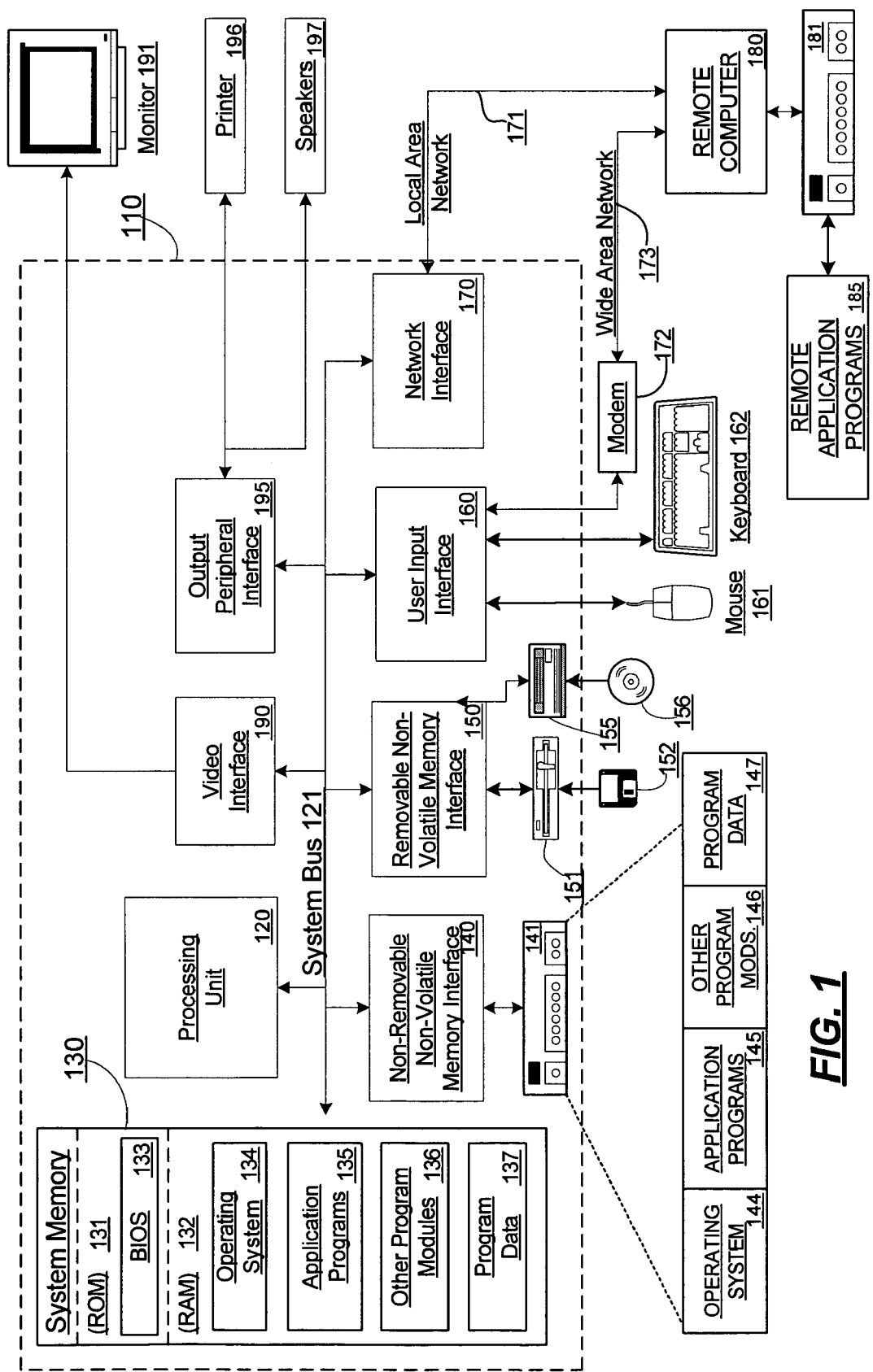
FIG. 1 is a block diagram of an exemplary computing environment in which aspects of the invention may be implemented.

FIG. 1 shows an exemplary computing environment in which aspects of the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The processing unit 120 may represent multiple logical processing units such as those supported on a multi-threaded processor. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 121 may also be implemented as a point-to-point connection, switching fabric, or the like, among the communicating devices.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad.

Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Plural Computing Environments on a Single Machine

As previously described, it is known in the art that two operating systems can execute side-by-side on a single computing device. One problem that the present invention can be used to address is how to provided some level of separation between two operating system, while still providing for some level of interaction between the two operating systems.

Figure 2:
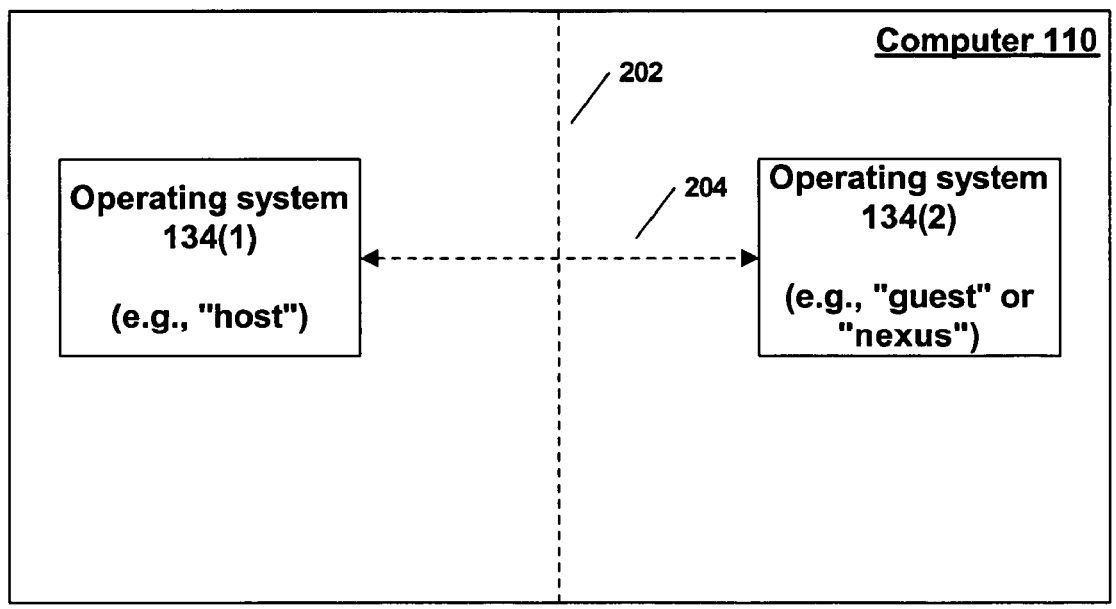
FIG. 2 is a block diagram of two exemplary execution environments that maintain some interaction with each other and some separation from each other.

FIG. 2 shows a system in which two operating systems 134(1) and 134(2) execute on a single computer 110. Some type of logical separation 202 exists between operating systems 134(1) and 134(2), such that a certain amount of interaction 204 is permitted between operating systems 134(1) and 134(2), while still allowing at least one of the operating systems to be protected against events that originate in the other operating system. In the example of FIG. 2, operating system 134(1) is a host operating system, and operating system 134(2) is a guest operating system, such as a "nexus" as described above. As previously noted, when operating system 134(2) is a nexus, it is desirable to construct separation 202 such that operating system 134(2) can interact with operating system 134(1) in order to borrow operating system 134(1)'s infrastructure, while still allowing operating system 134(2) to protect itself from actions (either malicious or innocent) that arise at operating system 134(1) and might cause operating system 134(2) to behave in a manner contrary to its behavioral specifications. (It will be understood, however, that the invention is not limited to the case where operating system 134(2) is a nexus.)

The separation 202 between operating systems 134(1) and 134(2) may, optionally, be enforced with the aid of a security monitor. A security monitor is a component external to both operating systems 134(1) and 134(2), which provides some security services that may be used to protect operating system 134(2) from operating system 134(1). For example, a security monitor may control access to certain hardware, may manage the use of memory (to give operating system 134(2) exclusive use of some portions of memory), or may facilitate the communication of data from operating system 134(1) to operating system 134(2) in a secure way. It should be noted that the use of a security monitor represents one model of how operating system 134(2) can be protected from operating system 134(1), although the use of a security monitor is not required. As another example, operating system 134(2) could include all of the functionality necessary to protect itself from operating system 134(1).

It should be noted that FIG. 2 shows operating system 134(1) as a "host" and operating system 134(2) as a "guest." In general, this characterization refers to the fact that, in these examples, operating system 134(1) provides certain operating system infrastructure that is used by both operating systems 134(1) and 134(2) (e.g., device drivers, scheduling, etc.), and operating system 134(2) is a "guest" in the sense that it preferably lacks this infrastructure but rather uses the infrastructure of operating system 134(1). However, it should be noted that the parameters of what makes an operating system a "host" or a "guest" are flexible. Moreover, it should be noted that traditional concepts of "host" and "guest" operating systems presume that the host needs to protect itself from actions of the guest. In the example of FIG. 2, however, guest operating system 134(2) is presumed to be a high-assurance operating system that needs to protect itself from host operating system 134(1). In the examples that follow, we shall generally refer to operating system 134(1) as the "host" and operating system 134(2) as the "guest" or "nexus" for the purpose of distinguishing between them. It should be appreciated that the techniques described herein can be applied to the interaction of any two or more operating systems running on the same machine (or even on the same set of connected machines).

Providing a Graphical User Interface with Plural Computing Environments on a Single Machine When a user interacts with programs on a computer system containing a high-assurance operating system, the user does so by means of a user input device, such as mouse 161 or keyboard 162 (from FIG. 1). As discussed above, allowing the windowing system running on host operating system 134(1) control the destination of the stream of input events may allow an attack using a compromised host operating system or application. A window or other graphical user interface element may be displayed by a host-side process to the user, which may attempt to imitate a legitimate nexus-side process, running on nexus operating system 134(2). Therefore, according to one embodiment of the invention, several techniques for protecting the integrity and identifiableness of legitimate host-side windows and other graphical user interface elements are implemented. In various embodiments of the invention, any one or all of these techniques are implemented together.

Figure 3A:
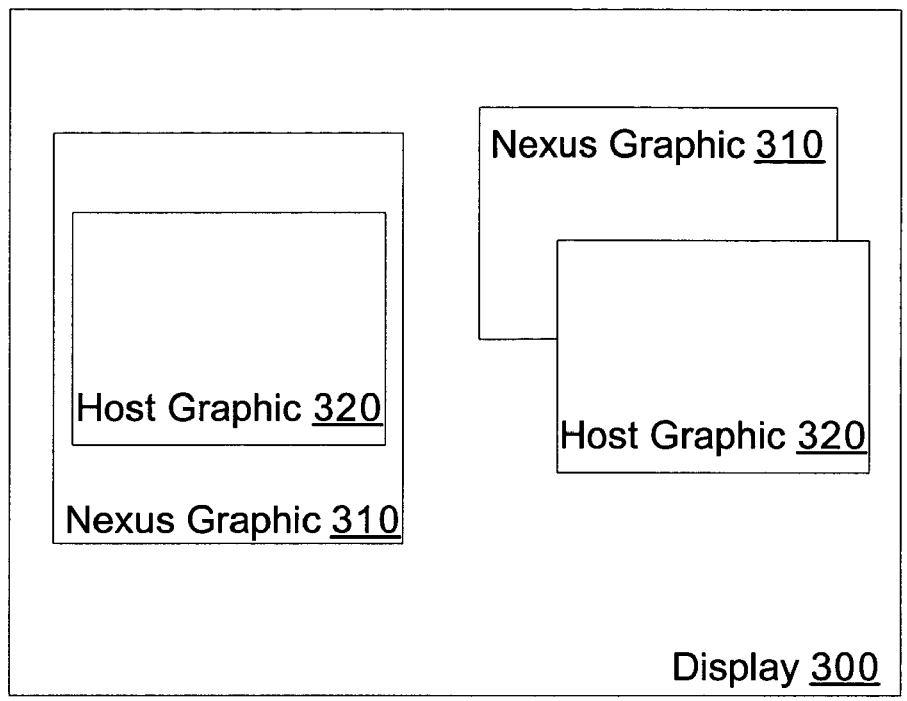
FIG. 3(*a*) is a block diagram of a display.
Figure 3B:
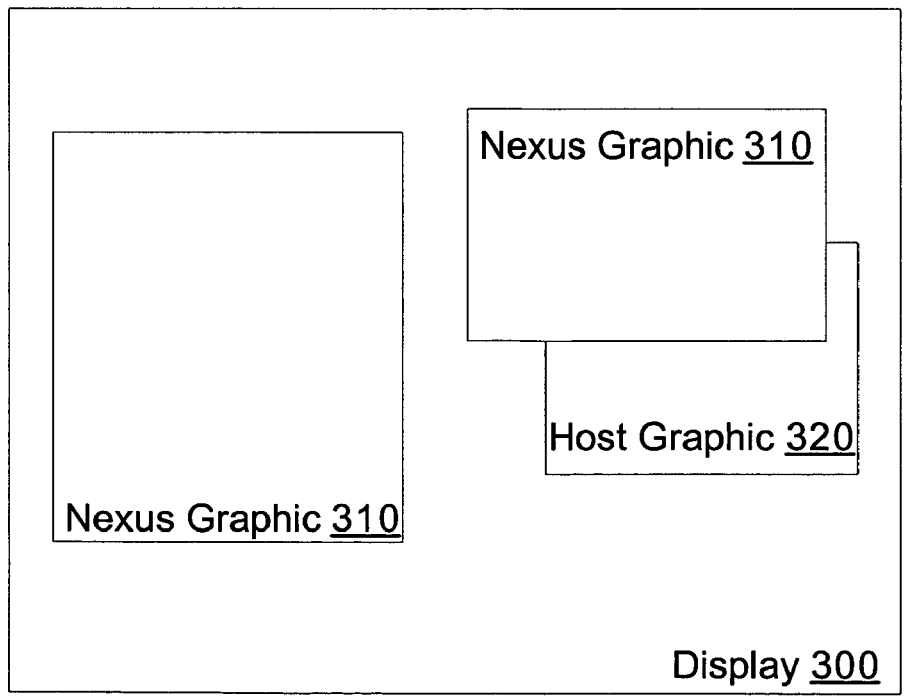

Obscuration and Show-Through

Where both host-side and nexus-side processes can display graphics, such as windows and other user interface elements, on a display, an attack can be accomplished by obscuring all or part of a legitimate nexus-side process graphic with a host-side process graphic. FIG. 3(*a*) is a block diagram of a display. In FIG. 3(*a*), on display 300, nexus graphics 310 are graphics owned by nexus processes, running on the nexus operating system 134(2). Host graphics 320 are graphics owned by host processes, running on the host operating system 134(1). As shown in FIG. 3(*a*), where host graphics 320 are allowed to be displayed on top of nexus graphics 310, the nexus graphics may be obscured by the host graphics 320. In this case, an attack may be mounted by obscuring some or all of nexus graphic 310 with a host graphic 320. Additionally, if the nexus graphic 310 overlays a host graphic 320 but is partially transparent, the host graphic 320 may be used to change the appearance of the nexus graphic 310 in a confusing way.

In one embodiment, such attacks are prevented by preventing the all nexus graphics 310 from being obscured, and prohibiting any show-through in nexus graphics 310. Thus, for the situation shown in FIG. 3(*a*), the nexus graphics 310 would not be allowed to be obscured. FIG. 3(*b*) is an illustration of the prohibition on obscuration of nexus graphic 310. In FIG. 3(*b*), each of the two nexus graphics 310 are fully shown, and no overlap by a host graphic 320 of a nexus graphic 310 is permitted. In addition, in one embodiment, no transparency (either full transparency or partial transparency) is permitted in a nexus graphic 310.

In one embodiment, in order to prevent similar attacks from one nexus-side process on another, nexus graphics 310 may not overlap. In a windowing system, one embodiment allows one exception to this—the mouse cursor, which may be drawn by a nexus-side process when being displayed over a nexus graphic 310, may be allowed to overlap a nexus-side graphic 310.

In another embodiment, if one nexus-side process owns two or more user interface graphic elements, for example two windows or a window and a dialog box, no security issue is implicated in allowing these to overlap. Thus, one commonly-owned user interface graphic element is allowed to overlap another commonly-owned user interface graphic element owned by a nexus process. In still another embodiment, top-level graphic UI elements which are commonly-owned are not permitted to overlap, however, a top-level UI element may be overlapped by a child UI element of that top-level UI element. For example, in this embodiment, a dialog box which is a child UI element of a top-level window can overlap that window.

In one embodiment, in order to verify which user interface graphic elements are nexus-side user interface graphic elements, a hypothecated user interaction is provided which removes all non-nexus-side user interface graphic elements from the screen. A hypothecated user interaction is a user interaction which, in the context of the computer system, will always result in a specific consequence. Thus, when the secure display hypothecated user interaction, for example, a keystroke combination, occurs, the entire display is cleared, with the exception of nexus-side user interface graphic elements.

Figure 4:
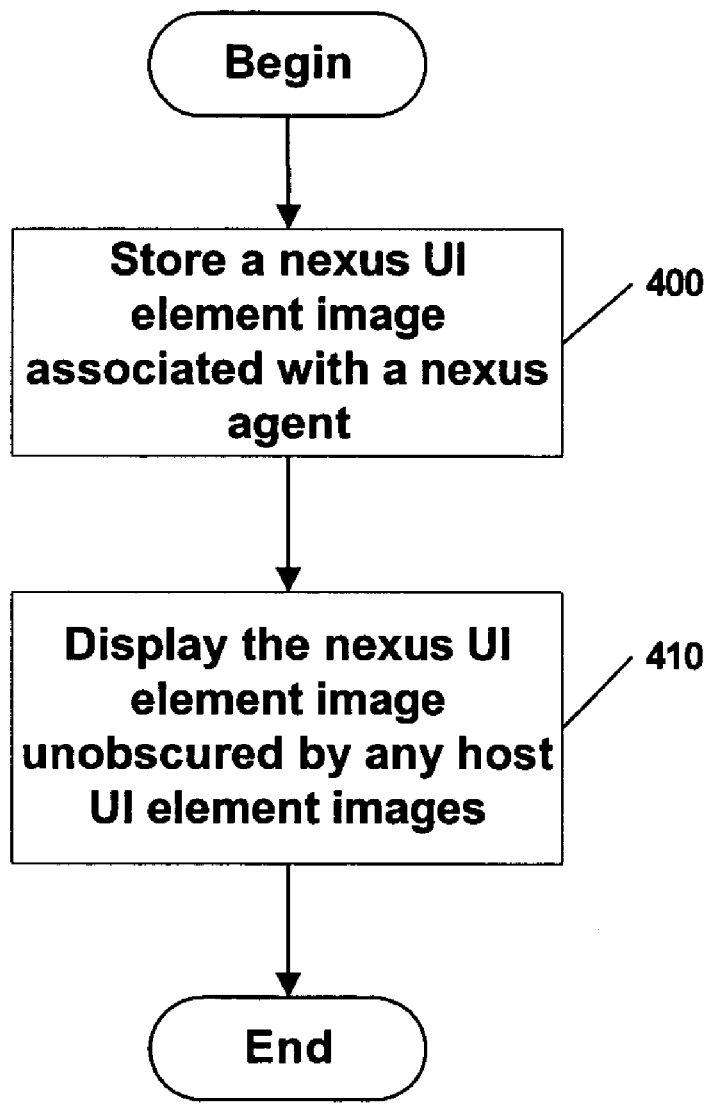
FIG. 4 is a flow diagram of a method for maintaining the security of data displayed on a display.

FIG. 4 is a flow diagram of this method. In step 400, a nexus graphical user interface element image, associated with a process running on the secured execution environment (nexus agent) is stored. In step 410, the nexus graphical user interface element image is displayed completely, unobscured by any host user interface elements. In other embodiments, no graphical user interface elements (host or user) other than those associated with the process can obscure the nexus graphical user interface element.

Secret Sharing

In one embodiment, in order to prevent the spoofing attack described above, a secret is displayed which is hidden from the host-side. No process on the host side can access the secret, and therefore if a window or other graphic user interface element can display the secret, it is a host-side graphic user interface element.

In one embodiment, a secret is communicated to the nexus by the user. This nexus-user secret may be communicated to the nexus at trust-initialization time, for example when passwords are set by the user. The graphic user interface element may either display the nexus-user secret at all times or may display the nexus-user secret when challenged.

A trusted window manager on the nexus side controls the display of graphic user interface elements by processes on the nexus side. This trusted window manager is also responsible for window decorations, such as borders and titles of windows. In one embodiment, the nexus-user secret is not generally shared with processes in the nexus. It is, however, displayed in the window decoration by the trusted window manager. In an alternate embodiment, the nexus-user secret is displayed when a user requests it from the window. This request may be made on the window in focus through a hypothecated user interaction. For example, a specific combination of keystrokes may be the hypothecated user interaction which causes the window in focus to display the nexus-user secret. Alternatively, a window may include a drop down menu or activation area which, when selected by the mouse or by keystrokes causes a valid nexus graphic 310 to display the nexus-user secret.

The nexus-user secret may be an image or a phrase. An image can be a useful nexus-user secret, because they are easily identified by the user and hard to describe. If the image selected by the user for use as the nexus-user secret is, for example, a photograph of the user's dog in front of the user's house, the photograph may be described by an attacker who views the image on the user's screen, however, even with that information an attacker would have difficulty recreating the image or finding a copy of it.

Figure 5:
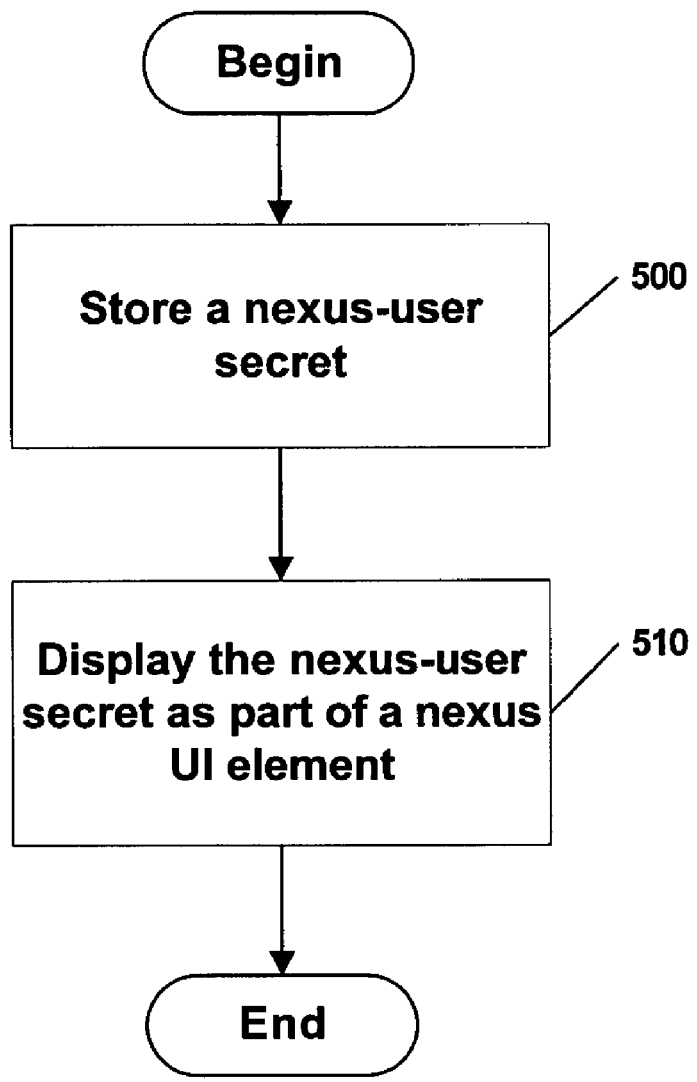
FIG. 5 is a flow diagram of a method for maintaining the security of data displayed on a display.

FIG. 5 is a flow diagram of this method. In step 500, a nexus-user secret associated with the nexus is stored. In step 510, the nexus-user secret element image is displayed as part of a nexus graphical user interface element.

Continual Secret Permutation

As described, in one embodiment a trusted window manager is the intermediary through which all nexus-side processes display their user interface graphic elements, and the trusted window manager is solely responsible for the window decoration, such as borders, on user interface graphic elements. In one embodiment, the window decoration includes a continually-updated short term secret. This continually updated secret is not accessible to non-nexus windows, and can thus be used to identify a non-host window.

For example, where the border of each nexus user interface graphic element is a specific color, and that color changes once every 15 seconds, it will be obvious to a user when a given window border does not match other nexus user interface graphic elements that that window is not a nexus-side user interface graphic elements. Other possible continually updated secrets may include: small graphics, combinations of icons, glyphs, or characters displayed in the window decoration, or hexadecimal or numeric strings. Any piece of information which can be visually compared with discrepancies noted fairly easily by a user might be used.

Figure 6:
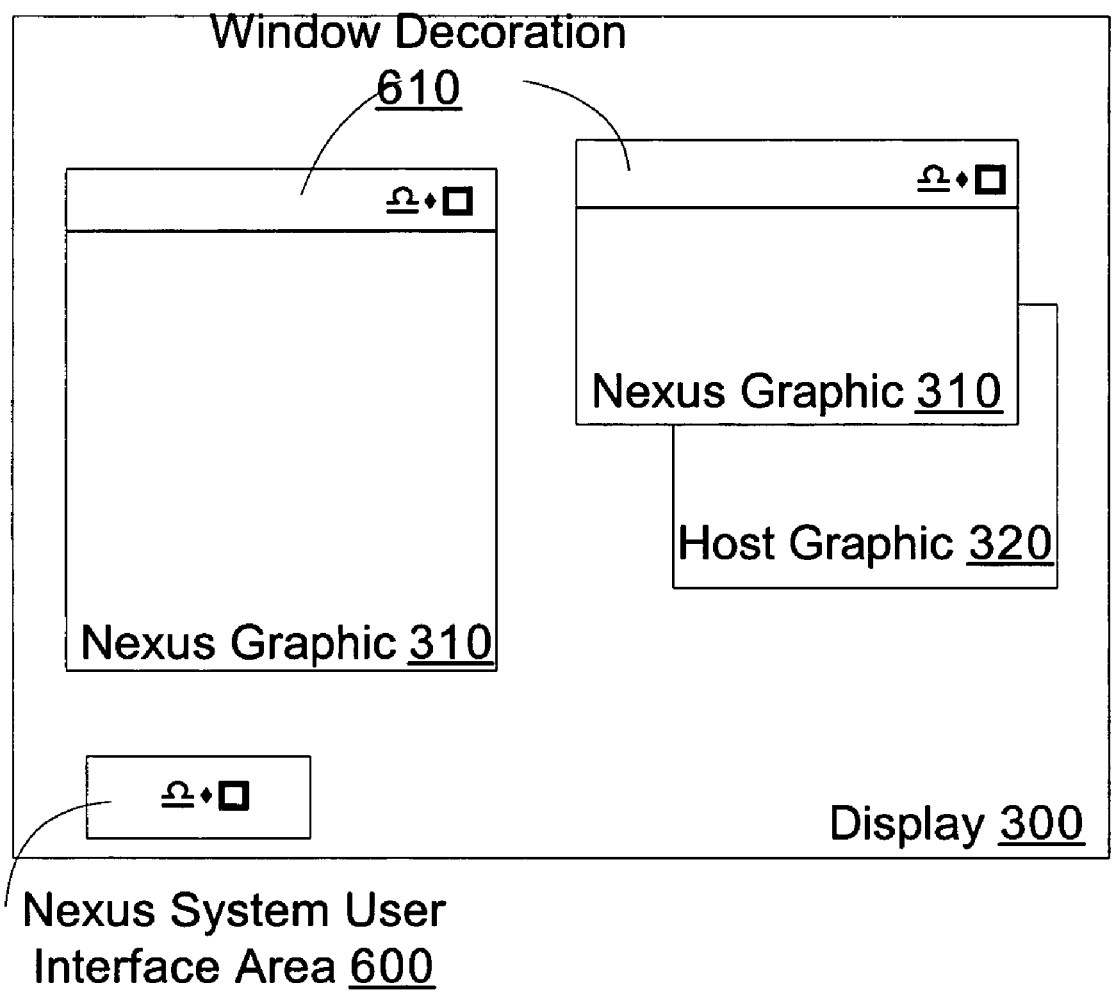
FIG. 6 is a block diagram of a display according to one embodiment of the invention.

In one embodiment, a nexus system user interface area is maintained on the display 300 whenever a nexus graphic 310 is displayed. This user interface area lists information regarding the nexus graphics 310 being displayed. For example, the user interface area may list the number of nexus graphics 310 being displayed, or the names of the nexus graphics 310 being displayed (e.g. window titles.) The shared secret in the decoration of the nexus graphics 310 is also displayed in the nexus system user interface area. FIG. 6 is a block diagram of a display according to one embodiment of the invention. In FIG. 6, a series consisting of three glyphs ("⚷♦☐") is displayed in window decoration 610 of each nexus graphic 310 on the display 300. A nexus system interface area 600 is also displayed, which includes the same set of three glyphs. This allows easy user confirmation that a window is being displayed by a nexus-side process.

While the changing of the secret may be time-based, such as a colored border that changes every 15 seconds, as described above, in other embodiments, the secret permutes when the user requests it, through a hypothecated user interaction, or when a system event such as the change of focus from one window to another occurs.

Figure 7:
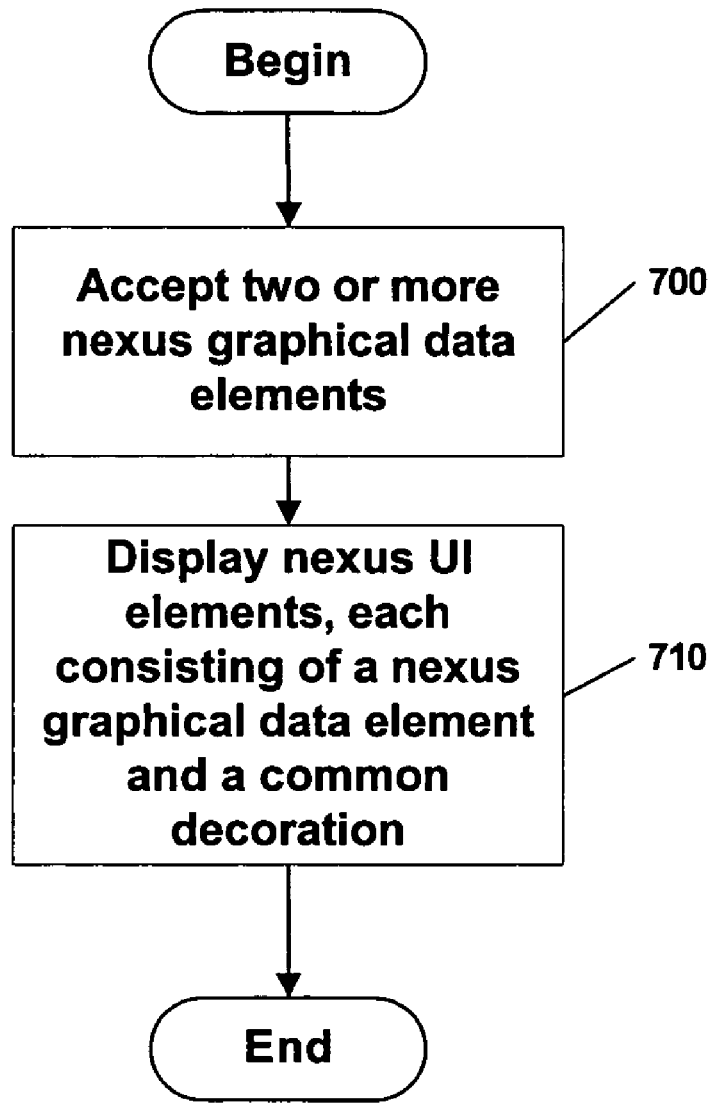
FIG. 7 is a flow diagram of a method for maintaining the security of data displayed on a display.

FIG. 7 is a flow diagram of this method. In step 700, at least two nexus graphical data elements are accepted. In a windowing system, these, along with the window decorations, will constitute a window image. In step 710, two nexus graphical user interface elements (e.g. windows) are displayed—each comprising one of the graphical data elements in addition to decoration which is common to each window.

Window Titles—Public and Private

As described, a trusted window manager can be used as an intermediary through which all nexus-side processes display their user interface graphic elements. However, a host-side window manager can be used to manage the display of host-side processes' user interface graphic elements. In one embodiment, for each nexus-side user interface graphic element (such as nexus graphic 310) a corresponding shadow graphic user interface elements is maintained by the host-side window manager. This allows the host-side window manager to recognize that certain areas of the display 300 are being used by nexus graphics 310. When obscuration and show-through are prohibited, as described above, this may be useful information for the host-side window manager, so windows which should be visible are not placed in these areas. However, only limited information about nexus graphics 310 should be available in the host-side.

In one embodiment, therefore, the trusted window manager allows a nexus agent (a process running on the nexus) to set two titles for each window or other user interface graphic element. One title, the private title, is passed to the trusted window manager and used for window management functions and for display in nexus graphic 310. This private title is not shared by the trusted window manager with any host-side processes or with any nexus-side processes other than the nexus agent which owns the window (or other element.)

In addition to the private title, the nexus agent can also specify a public title. This public title may be shared with the host-side, including the host-side window manager. The public title may be used by the host-side window manager as the title for the shadow window. In this way, the host-side window manager can reference the window using the public title, which is selected in order to be understandable to the user without including information which may breach confidentiality. Thus, where the host-side window manager allows a user to select a window to focus on from a list of windows, the public title, associated with the shadow window, is listed as an option to select. When the shadow window is selected, the associated trusted window will be activated, and the nexus agent associated with the associated trusted window will become the focus of user input.

Figure 8:
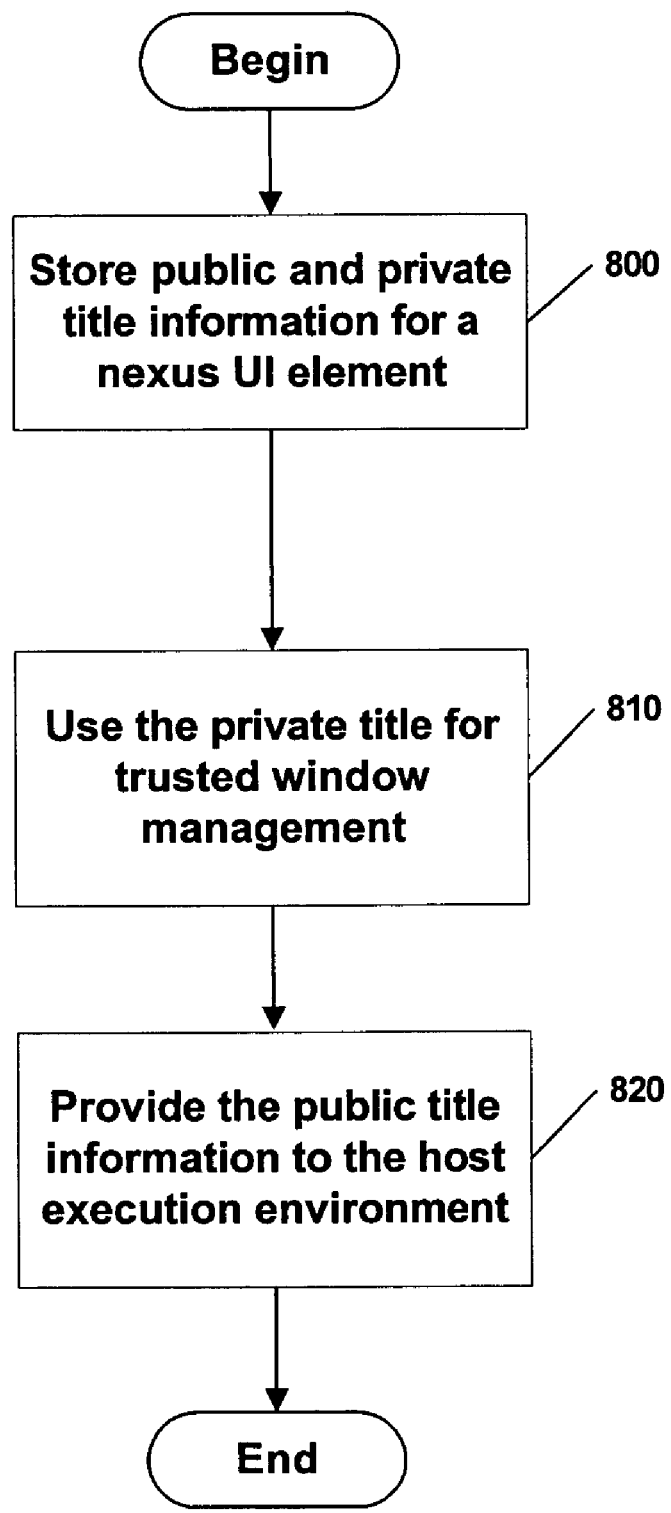
FIG. 8 is a flow diagram of a method for maintaining the security of data displayed on a display.

FIG. 8 is a flow diagram of this method. In step 800, public title information and private title information is stored for a nexus graphical user interface element associated with a nexus agent. In step 810, the private title information is used for window management functions of the trusted window manager. In step 820, the public title information is provided to the host for use on the host-side.

Conclusion

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed:

1. A method for maintaining a security of data displayed on a display for a computing system comprising a secured execution environment and a second execution environment, the method comprising:
    operating, on the computing system, the second execution environment concurrently with the secured execution environment;
    displaying a graphical user interface element of said secured execution environment, said graphical user interface element being associated with a first process running on said secured execution environment, wherein a shadow graphical user interface element corresponding to the graphical user interface element is maintained by the second execution environment;
    storing public title information and private title information for the graphical user interface element;
    using said private title information for window management functions on said secured execution environment when displaying said graphical user interface element; and
    providing said public title information for use in said second execution environment.

2. The method of claim 1, wherein displaying said graphical user interface element comprises:
    ensuring that said graphical user interface element contains no areas of transparency.

3. The method of claim 1, wherein displaying said graphical user interface element on a display comprises displaying said graphical user interface element such that no part of said graphical user interface element is obscured by a graphical user interface element associated with a second process running on said secured execution environment.

4. The method of claim 1, further comprising:
    displaying only said graphical user interface elements on said display upon receipt of a user secure display indication.

5. A method for maintaining a security of data displayed on a display for a computing system comprising a secured execution environment and a second execution environment, the method comprising:
    operating, on the computing system, the second execution environment concurrently with the secured execution environment;
    storing a user secret associated with said secured execution environment; and
    displaying a graphical user interface element of said secured execution environment comprising said user secret on said display, where said graphical user interface element is associated with a process running on said secured execution environment, wherein a shadow graphical user interface element corresponding to the graphical user interface element is maintained by the second execution environment;
    storing public title information and private title information for the graphical user interface element;
    using said private title information for window management functions on said secured execution environment when displaying said graphical user interface element; and
    providing said public title information for use in said second execution environment.

6. The method of claim 5, wherein displaying a graphical user interface element comprising said user secret on a display comprises:
    accepting a user secret display indication; and
    displaying said user secret.

7. A method for maintaining a security of data displayed on a display for a computing system comprising a secured execution environment and a second execution environment, the method comprising:
    operating, on the computing system, the second execution environment concurrently with the secured execution environment, the secured execution environment comprising a nexus and the second execution environment comprising a different operating system;
    accepting at least two graphical data elements of said nexus, each associated with a process running on said secured execution environment, for display on said display; and
    displaying at least two graphical user interface elements of said nexus, each of said nexus graphical user interface elements comprising one of said nexus graphical data elements and a common graphical user interface decoration, wherein for each of the at least two nexus graphical user interface elements the second execution environment maintains a corresponding shadow graphical user interface element;
    storing public title information and private title information for at least one of the graphical user interface elements;
    using said private title information for window management functions on said secured execution environment when displaying said at least one of the graphical user interface elements; and
    providing said public title information for use in said second execution environment.

8. The method of claim 7, where said common graphical user interface decoration comprises a colored border.

9. The method of claim 7, where said common graphical user interface decoration comprises one or more randomly selected images.

10. The method of claim 7, further comprising:
changing said common graphical user interface decoration when a set time period elapses.

11. The method of claim 7, further comprising:
changing said common graphical user interface decoration when a user decoration change indication is received.

12. A method for maintaining a security of data displayed on a display for a computing system comprising a secured execution environment and a second execution environment, the method comprising:
operating, on the computing system, the second execution environment concurrently with the secured execution environment, the secured execution environment comprising a nexus and the second execution environment comprising a different operating system;
storing public title information and private title information for a graphical user interface element of said nexus, the nexus graphical user interface element being associated with a process running on said secured execution environment, wherein a shadow graphical user interface element corresponding to the nexus graphical user interface element is maintained by the second execution environment;
using said private title information for window management functions on said secured execution environment when displaying said nexus graphical user interface element; and
providing said public title information for use in said second execution environment.

13. The method of claim 12, the second execution environment comprising a host window manager for managing graphical user interface elements on said display, where said host window manager creates the shadow graphical user interface element for said nexus graphical user interface element, and where said public title information is used by said host window manager.

14. The method of claim 12, further comprising:
displaying each of said nexus graphical user interface element on said display completely on a display, such that no part of said nexus graphical user interface element is obscured by a graphical user interface element associated with said second execution environment on said display, where each of said nexus graphical user interface elements comprises a common graphical user interface decoration;
storing a nexus-user secret associated with said secured execution environment; and
displaying a nexus-user secret graphical user interface element comprising said nexus-user secret on said display.

15. A computer-readable storage medium containing computer executable instructions to maintain a security of data displayed on a display for a computing system comprising a secured execution environment and a second execution environment, the computer-executable instructions to perform acts comprising:
operating, on the computing system, the second execution environment concurrently with the secured execution environment;
displaying a graphical user interface element of said secured execution environment, said graphical user interface element being associated with a first process running on said secured execution environment, wherein a shadow graphical user interface element corresponding to the graphical user interface element is maintained by the second execution environment;
storing public title information and private title information for the graphical user interface element;
using said private title information for window management functions on said secured execution environment when displaying said graphical user interface element; and
providing said public title information for use in said second execution environment.

16. The computer-readable storage medium of claim 15, where said act of displaying said graphical user interface element comprises:
ensuring that said graphical user interface element contains no areas of transparency.

17. The computer-readable storage medium of claim 15, where said act of displaying said graphical user interface element on a display comprises displaying said graphical user interface element such that no part of said graphical user interface element is obscured by a graphical user interface element associated with a second process running on said secured execution environment.

18. The computer-readable storage medium of claim 15, wherein the computer-executable instructions are adapted to perform acts further comprising:
displaying only said graphical user interface elements on said display upon receipt of a user secure display indication.

19. A computer-readable storage medium containing computer executable instructions to maintain a security of data displayed on a display for a computing system comprising a secured execution environment and a second execution environment, the computer-executable instructions to perform acts comprising:
operating, on the computing system, the second execution environment concurrently with the secured execution environment;
storing a user secret associated with said secured execution environment; and
displaying a graphical user interface element of said secured execution environment comprising said user secret on said display, where said graphical user interface element is associated with a process running on said secured execution environment, wherein a shadow graphical user interface element corresponding to the graphical user interface element is maintained by the second execution environment;
storing public title information and private title information for the graphical user interface element;
using said private title information for window management functions on said secured execution environment when displaying said graphical user interface element; and
providing said public title information for use in said second execution environment.

20. The computer-readable storage medium of claim 19, where said act of displaying a graphical user interface element comprising said user secret on a display comprises:
accepting a user secret display indication; and
displaying said user secret.

21. A computer-readable storage medium containing computer executable instructions to maintain a security of data displayed on a display for a computing system comprising a secured execution environment and a second execution environment, the computer-executable instructions to perform acts comprising:
operating, on the computing system, the second execution environment concurrently with the secured execution environment, the secured execution environment comprising a nexus and the second execution environment comprising a different operating system;

accepting at least two graphical data elements of said nexus, each associated with a process running on said secured execution environment, for display on said display; and displaying at least two graphical user interface elements of said nexus, each of said nexus graphical user interface elements comprising one of said nexus graphical data elements and a common graphical user interface decoration, wherein for each of the at least two nexus graphical user interface elements the second execution environment maintains a corresponding shadow graphical user interface element, storing public title information and private title information for at least one of the graphical user interface elements;

using said private title information for window management functions on said secured execution environment when displaying said at least one of the graphical user interface elements; and providing said public title information for use in said second execution environment.

22. The computer-readable storage medium of claim 21, where said common graphical user interface decoration comprises a colored border.

23. The computer-readable storage medium of claim 21, where said common graphical user interface decoration comprises one or more randomly selected images.

24. The computer-readable storage medium of claim 21, wherein the computer-executable instructions are adapted to perform acts further comprising:

changing said common graphical user interface decoration when a set time period elapses.

25. The computer-readable storage medium of claim 21, wherein the computer-executable instructions are adapted to perform acts further comprising:

changing said common graphical user interface decoration when a user decoration change indication is received.

26. A computer-readable storage medium containing computer executable instructions to maintain a security of data displayed on a display for a computing system comprising a secured execution environment and a second execution environment, the computer-executable instructions to perform acts comprising:

operating, on the computing system, the second execution environment concurrently with the secured execution environment, the secured execution environment comprising a nexus and the second execution environment comprising a different operating system;

storing public title information and private title information for a graphical user interface element of said nexus, the nexus graphical user interface element being associated with a process running on said secured execution environment, wherein a shadow graphical user interface element corresponding to the nexus graphical user interface element is maintained by the second execution environment;

using said private title information for window management functions on said secured execution environment when displaying said nexus graphical user interface element; and providing said public title information for use in said second execution environment.

27. The computer-readable storage medium of claim 26, the second execution environment comprising a host window manager for managing graphical user interface elements on said display, where said host window manager creates the shadow graphical user interface element for said nexus graphical user interface element, and where said public title information is used by said host window manager.

28. The computer-readable storage medium of claim 26, wherein the computer-executable instructions are adapted to perform acts further comprising:

displaying said nexus graphical user interface element on said display, such that no part of said nexus graphical user interface element is obscured by a graphical user interface element associated with said second execution environment on said display, where said nexus graphical user interface element comprises a common graphical user interface decoration;

storing a nexus-user secret associated with said secured execution environment; and displaying a nexus-user secret graphical user interface element comprising said nexus-user secret on said display.

29. A computing system for maintaining a security of data displayed on a display, the computing system comprising:

a secured execution environment and a second execution environment operating concurrently on the computing system, the secured execution environment comprising a nexus and the second execution environment comprising a different operating system;

first storage in said secured execution environment for storing private title information for a graphical user interface element of said nexus, the nexus graphical user interface element being associated with a process running on said secured execution environment, and a nexus-user secret associated with said secured execution environment, wherein a shadow graphical user interface element corresponding to the nexus graphical user interface element is maintained by the second execution environment;

second storage in said second execution environment for storing public title information for said nexus graphical user interface element; and a trusted window manager for displaying said nexus graphical user interface element on said display, such that no part of said nexus graphical user interface element is obscured by a graphical user interface element associated with said second execution environment on said display, where said nexus graphical user interface element comprises a common graphical user interface decoration and said private title information.

30. The computing system of claim 29, where said trusted window manager displays a nexus-user secret graphical user interface element comprising said nexus-user secret on said display.

* * * * *